US008032831B2

(12) United States Patent
Zubizarreta

(10) Patent No.: US 8,032,831 B2
(45) Date of Patent: Oct. 4, 2011

(54) COMPUTER-IMPLEMENTED WORKFLOW REPLAYER SYSTEM AND METHOD

(75) Inventor: Miguel A. Zubizarreta, Westlake, OH (US)

(73) Assignee: Hyland Software, Inc., Westlake, OH (US)

( * ) Notice: Subject to any disclaimer, the term of this patent is extended or adjusted under 35 U.S.C. 154(b) by 609 days.

(21) Appl. No.: 10/952,643

(22) Filed: Sep. 29, 2004

(65) Prior Publication Data

US 2005/0071187 A1    Mar. 31, 2005

Related U.S. Application Data

(60) Provisional application No. 60/507,239, filed on Sep. 30, 2003.

(51) Int. Cl.
*G06F 3/00* (2006.01)
(52) U.S. Cl. .................................... 715/704; 715/716
(58) Field of Classification Search .................. 715/704, 715/703, 853–855, 705, 730, 715, 716, 720, 715/744, 745
See application file for complete search history.

(56) References Cited

U.S. PATENT DOCUMENTS

| | | | |
|---|---|---|---|
| 1,865,504 A | 7/1932 | Bird | |
| 4,923,365 A | 5/1990 | Rollwage | |
| 5,038,392 A | 8/1991 | Morris et al. | |
| 5,161,214 A | 11/1992 | Addink et al. | |
| 5,168,444 A | 12/1992 | Cukor et al. | |
| 5,630,069 A | 5/1997 | Flores et al. | |
| 5,706,452 A | 1/1998 | Ivanov | |
| 5,734,837 A | 3/1998 | Flores et al. | |
| 5,762,469 A | 6/1998 | Yu | |
| 5,860,066 A | 1/1999 | Rouse | |
| 5,878,398 A | 3/1999 | Tokuda et al. | |
| 5,887,154 A | 3/1999 | Iwasa et al. | |
| 5,975,843 A | 11/1999 | Ebihara | |
| 5,999,724 A | 12/1999 | Iwasa et al. | |
| 6,026,365 A | 2/2000 | Hayashi | |
| 6,038,541 A | 3/2000 | Tokuda et al. | |
| 6,237,006 B1 * | 5/2001 | Weinberg et al. | 707/103 R |
| 6,299,406 B1 | 10/2001 | Yu et al. | |
| 6,314,425 B1 | 11/2001 | Serbinis et al. | |
| 6,370,567 B1 | 4/2002 | Ouchi | |
| 6,401,073 B1 | 6/2002 | Tokuda et al. | |
| 6,438,548 B1 | 8/2002 | Grim, III et al. | |
| 6,511,283 B1 | 1/2003 | Yoshioka | |
| 6,584,466 B1 | 6/2003 | Serbinis et al. | |
| 6,834,371 B1 * | 12/2004 | Jensen et al. | 715/500.1 |
| 7,065,493 B1 * | 6/2006 | Homsi | 705/8 |
| 7,131,068 B2 * | 10/2006 | O'Neal et al. | 715/730 |

(Continued)

OTHER PUBLICATIONS

Chang et al., "Oracle Workflow Guide, Release 2.0.3", Part No. A56104-01, copyright 1997 Oracle Corporation, http://download.oracle.com/docs/cd/A60725_05/pdf/wfug.pdf.*

(Continued)

*Primary Examiner* — William L Bashore
*Assistant Examiner* — Andrew Tank
(74) *Attorney, Agent, or Firm* — Jones Day

(57) ABSTRACT

Systems and methods for replaying historical workflow information. Workflow information is collected while tasks and documents are being processed. The collected workflow information is stored in a database so that at a later point in time, the historical workflow information may be retrieved and provided to a user. Through computer-human interfaces, the user can move forwards and/or backwards while replaying the collected historical workflow information.

44 Claims, 15 Drawing Sheets

U.S. PATENT DOCUMENTS

| | | |
|---|---|---|
| 2001/0027408 A1 | 10/2001 | Nakisa |
| 2001/0027477 A1 | 10/2001 | Nakamura et al. |
| 2001/0034738 A1 | 10/2001 | Cantwell et al. |
| 2002/0010705 A1 | 1/2002 | Park et al. |
| 2002/0013786 A1 | 1/2002 | Machalek |
| 2002/0026297 A1 | 2/2002 | Leymann et al. |
| 2002/0038357 A1 | 3/2002 | Haverstock et al. |
| 2002/0069101 A1 | 6/2002 | Vincent |
| 2002/0073161 A1 | 6/2002 | Yamazaki et al. |
| 2002/0075293 A1* | 6/2002 | Charisius et al. ............. 345/704 |
| 2002/0087385 A1 | 7/2002 | Vincent |
| 2002/0107931 A1 | 8/2002 | Singh et al. |
| 2002/0116399 A1 | 8/2002 | Camps et al. |
| 2002/0120581 A1 | 8/2002 | Schiavone et al. |
| 2002/0128890 A1 | 9/2002 | Dick et al. |
| 2002/0129081 A1 | 9/2002 | Rai et al. |
| 2002/0133392 A1 | 9/2002 | Angel et al. |
| 2002/0140730 A1 | 10/2002 | Linsey et al. |
| 2002/0140731 A1 | 10/2002 | Subramaniam et al. |
| 2002/0149618 A1 | 10/2002 | Estrada et al. |
| 2002/0152234 A1 | 10/2002 | Estrada et al. |
| 2002/0152254 A1 | 10/2002 | Teng |
| 2002/0154172 A1 | 10/2002 | Linsey et al. |
| 2002/0156808 A1 | 10/2002 | Duffy et al. |
| 2002/0165882 A1 | 11/2002 | Zettel et al. |
| 2002/0196479 A1 | 12/2002 | Simske |
| 2003/0014485 A1 | 1/2003 | Banatwala |
| 2003/0028562 A1 | 2/2003 | Shaughnessy et al. |
| 2003/0033167 A1 | 2/2003 | Arroyo et al. |
| 2003/0033192 A1 | 2/2003 | Zyman et al. |
| 2003/0055728 A1 | 3/2003 | Lin |
| 2003/0055811 A1 | 3/2003 | Stork et al. |
| 2003/0068828 A1 | 4/2003 | Dadala et al. |
| 2003/0069780 A1 | 4/2003 | Hailwood et al. |
| 2003/0074302 A1 | 4/2003 | Cope |
| 2003/0078801 A1 | 4/2003 | Cope |
| 2003/0078816 A1 | 4/2003 | Filep |
| 2003/0078820 A1 | 4/2003 | Ouchi |
| 2003/0078825 A1 | 4/2003 | Cope |
| 2003/0078874 A1 | 4/2003 | Cope |
| 2003/0079180 A1 | 4/2003 | Cope |
| 2003/0084053 A1 | 5/2003 | Govrin et al. |
| 2003/0088616 A1 | 5/2003 | Etessami et al. |
| 2003/0093475 A1 | 5/2003 | Chang et al. |
| 2003/0110256 A1 | 6/2003 | Yoon et al. |
| 2003/0115089 A1 | 6/2003 | Lurie |
| 2003/0115377 A1 | 6/2003 | Curtis et al. |
| 2003/0144867 A1 | 7/2003 | Campbell et al. |
| 2005/0027845 A1* | 2/2005 | Secor et al. ................... 709/223 |

OTHER PUBLICATIONS

Internet Web Archive (www.archive.org) of http://java.sun.com/products/jlf/ed2/book/Appendix.B5.html, Aug. 3, 2002.*

* cited by examiner

US 8,032,831 B2

COMPUTER-IMPLEMENTED WORKFLOW REPLAYER SYSTEM AND METHOD

RELATED APPLICATIONS

This application claims the benefit and priority of provisional application Ser. No. 60/507,239 filed Sep. 30, 2003 which is incorporated herein by reference in its entirety.

TECHNICAL FIELD

This document relates generally to computer-implemented workflow systems and more particularly to computer-implemented analysis of workflow systems.

BACKGROUND AND SUMMARY

Many software tools exist to track document workflow in a company. However when a workflow problem arises, such tools provide little or no effective mechanisms for a user to visually analyze workflow data that had been previously collected over a period of time. To overcome these and/or other disadvantages, systems and methods are provided for visually replaying historical workflow information. Users can move forwards and backwards while replaying on their computer screens historical workflow information.

DETAILED DESCRIPTION

Figure 1:
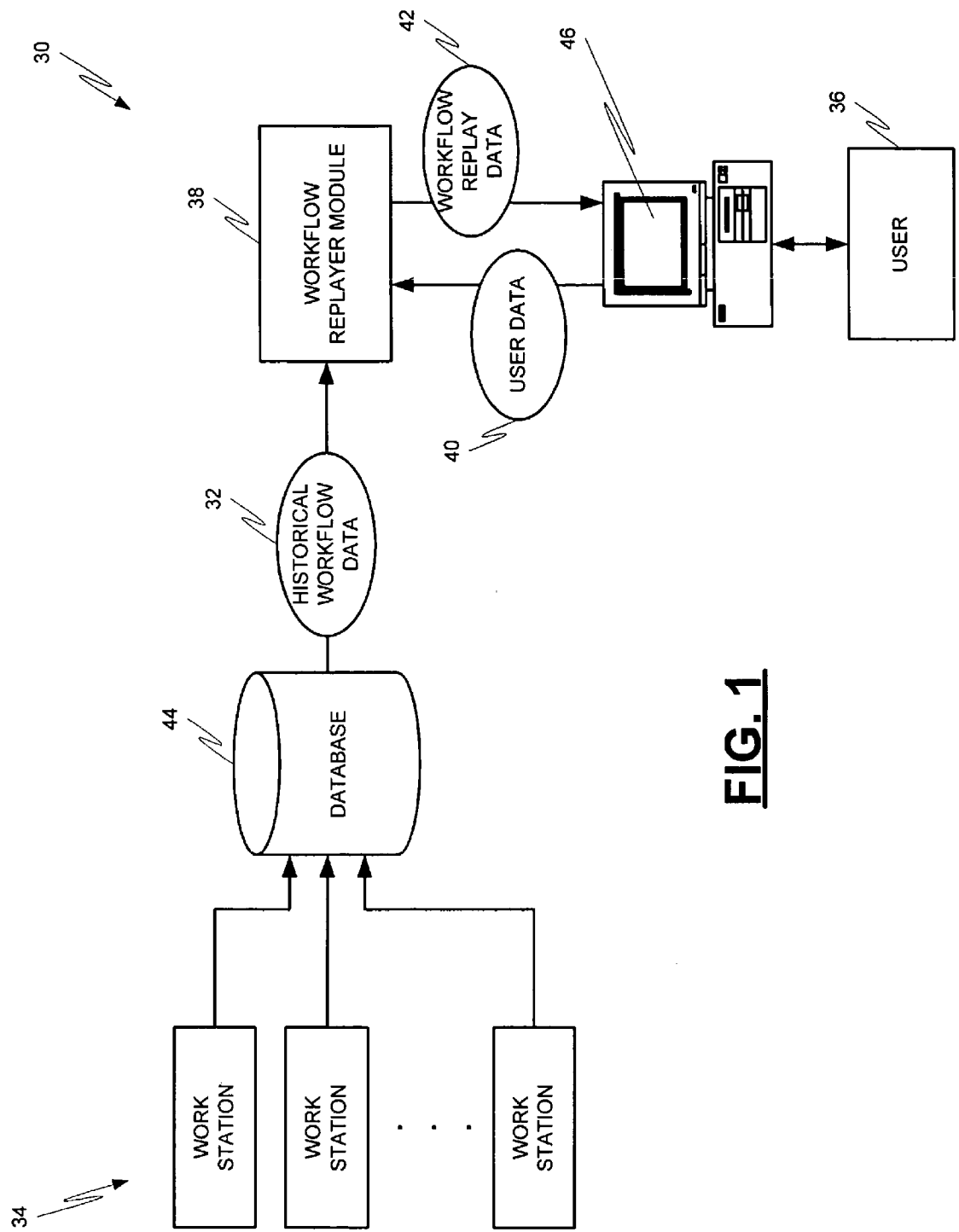
FIG. 1 is a block diagram depicting software and computer components for use in a workflow replaying system.

FIG. 1 depicts at 30 a computer-implemented system to perform workflow analysis. The system 30 analyzes workflow data 32 that had been collected over a period of time. The collected workflow data 32 represents the tracking of workflow items (e.g., tasks, documents, etc.) as they are handled by different workstations 34. A user 36 interacts with the system 30 to interactively view and analyze the historical workflow data 32 as it is being replayed at 42.

Within the system 30, a workflow replayer software module 38 receives input 40 from a user 36 that specifies what historical workflow data 32 the user 36 wishes to replay. For example, the user input 40 may specify such items as a workflow time period of interest, a particular business transaction, a workflow item, a particular document, or combinations thereof. The workflow replayer module 38 may provide a workflow search interface to facilitate such operations involving the user 36.

The workflow replayer module 38 retrieves historical workflow data 32 from a database 44 based upon the user provided data. The historical workflow data 32 can include any aspect related to the processing of work tasks, such as how the tasks are structured, who performs them, what their relative order is, how they are synchronized, how information flows to support the tasks, how tasks are being tracked, etc. The database 44 may store other types of information related to the workflow item, such as accounting information related to the task.

After retrieval of the historical workflow data 32, the workflow replayer module 38 allows the user 36 to step forwards and backwards through the historical workflow data 32. As the user 36 indicates whether the replaying is to proceed forwards or backwards, the workflow replayer module 38 generates the appropriate workflow replay data 42 for display to the user 36. The workflow replayer data 42 includes all or a portion of the retrieved historical workflow data 32 for display to the user 36. The workflow replay data 42 may also include additional data, such as data designating how the historical workflow data 32 is to be displayed on the user computer's interface 46.

The ability to manipulate workflow by winding it backwards in time, allows a user 36 to view it against a live database 44, without disturbing the actual location of any of those documents involved in the workflow replaying. For example, a manager may wish to just roll a task back to three hours ago to see what actually happened, or roll workflow back to yesterday without affecting the processing of the workstations or tasks and with everybody else in the organization still working in real-time going forward.

Figure 2A:
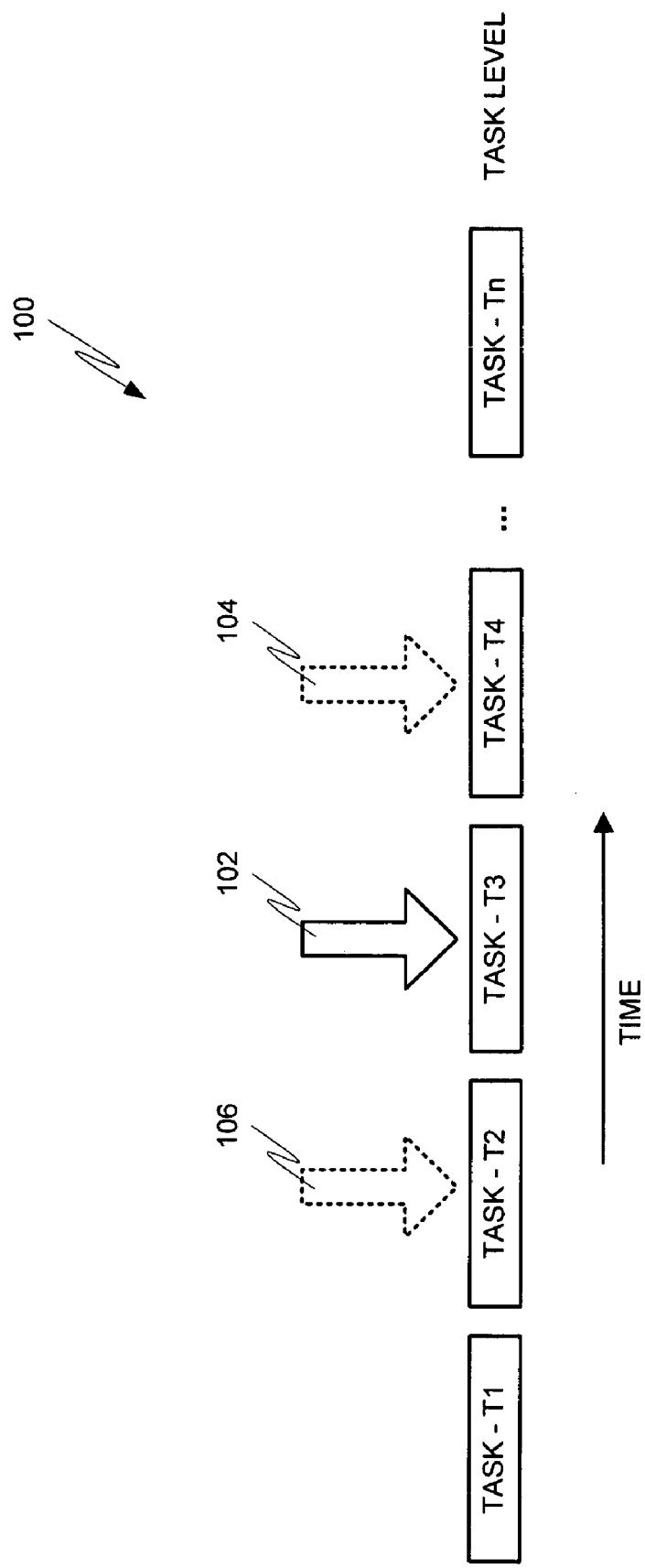
FIG. 2A is a user interface depicting an example of replaying historical workflow data associated with a task.

FIG. 2A depicts at 100 an example of displaying historical workflow data on a user interface. In this example, task replay data is displayed to the user. The user can indicate that the playing of the historical workflow data should begin at a particular point in time, such as time point 3 (shown at reference numeral 102). The user can then proceed forward from time point 3 (102) to time point 4 (104), or the user can proceed backwards from time point 3 (102) to time point 2 (106).

In stepping forward, the data associated with the task at time point 3 (102) is used to generate the workflow replay data that is then displayed to the user. If the user continues to step forward, then workflow replay data is generated related to the task at time point 4 (104) and so on.

The user can also elect to step back in time. If the user were at time point 3 (102) and elects to step backwards, then workflow replay data is generated for the task at time point 2 (106). The user can step further back in time until no more historical data is available for the selected task.

Figure 2B:
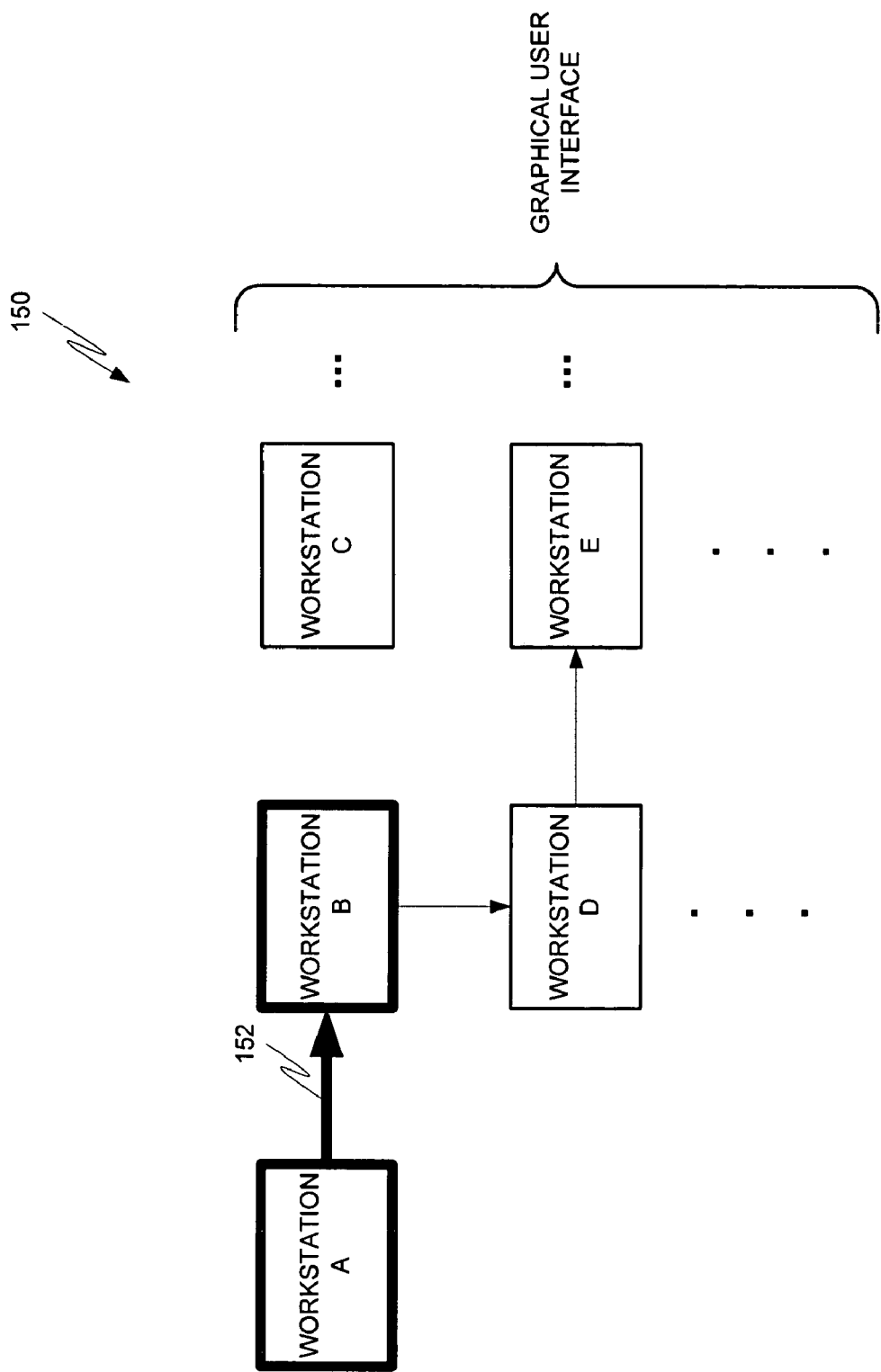
FIG. 2B is a user interface depicting an example of replaying historical workflow data associated with workstations.

As the user proceeds forwards or backwards in time, the workflow replay data may be displayed on the user's computer in many different formats, such as graphically, textually, or a combination of both. For example as shown at 150 in FIG. 2B, a graphical user interface may present a graphical layout of the workstations and show which workstations were working on the task. The arrow shown at 152 indicates that at this point in time of the workflow a document had been transferred from workstation A to workstation B.

A replaying system may be used with many different types of documents and tasks. For example, the document to be processed by the workstations may be one of the hundreds or thousands of insurance claims that an insurance company receives on a daily basis. The document is processed through the insurance company's workstations. One workstation receives a loss notice from the insurance broker; another workstation reviews the notice to ensure that it is complete before forwarding it to a supervisor; the supervisor reviews the file for compliance before approving it. The claim is further processed in an ordered fashion by other workstations until processing of the claim is complete. At each stage of the processing, workflow data is captured and stored in the database.

If a workflow problem had occurred during processing of a claim and is only discovered later (e.g., later that day or a month later), a user can access a workflow replayer module to recreate the actual workflow environment as it existed at that point in time. For example, a significant amount of overtime may have been required to process a certain number of claims that normally would not have required overtime. A workflow replayer module visually presents to the user the historical workflow data, such as what documents were at what workstations and at what time on that day. The user can click off the hours off one at a time, and watch what happened to the workflow. The user may see that something of interest occurred between 2:00 PM and 3:00 PM. The user can then select a finer level of detail to see how the workflow proceeded between 2:00 PM and 3:00 PM, such as seeing the workflow at five minute increments or on a per minute basis. The user can use the greater level of granularity to identify the problem, such as identifying a delay at a workstation that caused a cascading series of events. By allowing the user to step forwards and backwards through the day's workflow as it had actually occurred at that time in the past, the user can more easily identify the causes of problems.

Figure 2C:
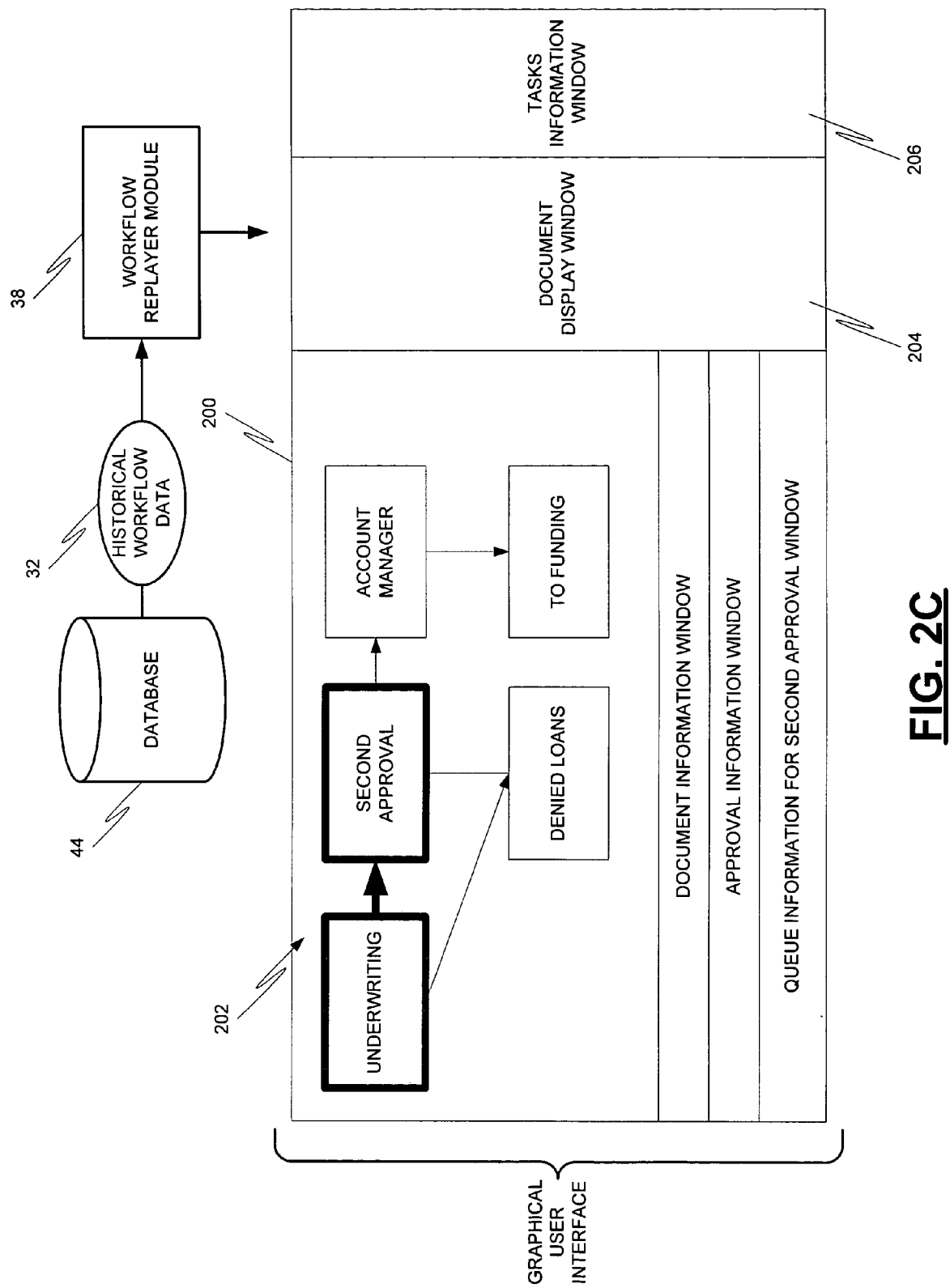
FIG. 2C is a user interface depicting multiple windows being used to replay different types of historical workflow data.

As another example, a loan processing manager may wish to replay the workflow associated with a loan production/approval process. The manager may view the graphical user interface 200 shown in FIG. 2C to verify that during a particular loan's processing, the status of loan files was being properly monitored by and automatically routed to the appropriate person(s). In this example, the manager checks during replaying the workflow 202 that when that loan file arrived it was assigned to an available underwriter, and that the underwriter processed the loan file.

The manager can check through the graphical user interface 200 such historical workflow information associated with the loan file as comments the underwriter entered as well as when the underwriter selected an action on that loan file (e.g., cancel, approve or deny). The manager may proceed forward in time to see if it was necessary for the loan file to be routed to multiple underwriters for approval before submission to an account manager. The manager can view other data, such as what approvals were obtained and what other documents were in a workstation's queue at a particular time. The manager can also see the loan document in the document display window 204 as well as information and task rules 206 established for handling a loan application.

Figure 3:
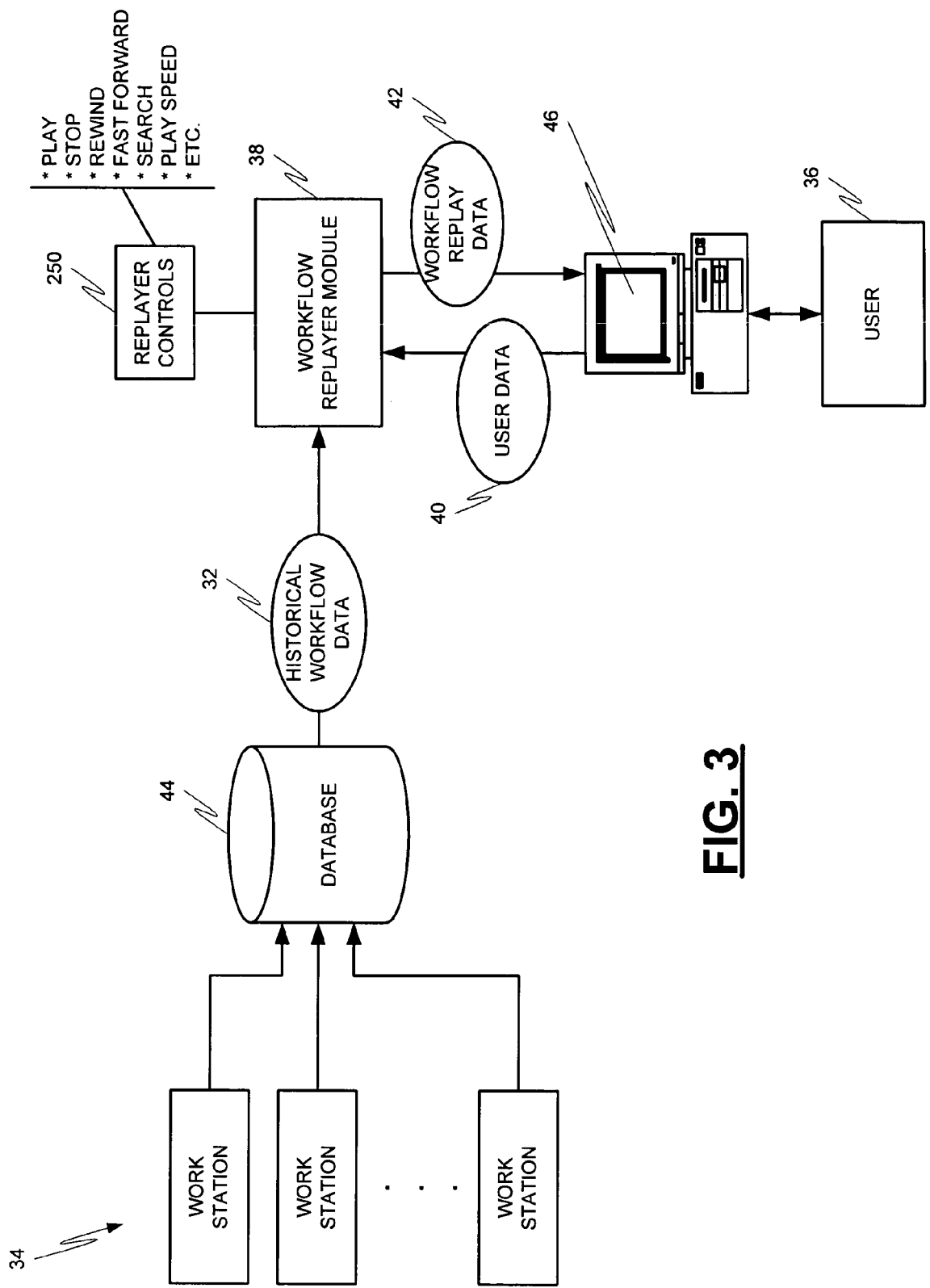
FIG. 3 is a block diagram depicting software and computer components for use in providing replayer controls to a user.

To assist the user in manipulating the workflow replay data 42, replayer controls 250 may be provided as shown in FIG. 3. The replayer controls 250 may include any number of replay functions, such as play, play backwards, stop, rewind, fast forward, search, pause, etc. The play function advances viewing of historical workflow data 32 forward in time (e.g., time T2 to time T3). The play backwards function replays historical workflow data 32 at a speed similar to the play function, but in a backwards manner (e.g., time T3 to time T2). The stop function stops the operation of another replay function. The rewind function operates to quickly move in a backwards time manner the replaying of historical workflow data 32. The fast forward function operates to quickly move in a forwards time manner the replaying of historical workflow data 32. The search function allows the user to search items that may be associated with historical workflow data 32, such as keywords that identify a task or an particular workstation. If a search locates one or more items in the historical workflow data 32 that match the user's search criteria, then the search results are displayed to the user 36. The user 36 can select item(s) of interest and view where in the workflow chronology the selection fits. The user 36 can move forwards and backwards in time with respect to the selected item. The pause function pauses the replaying of historical workflow data 32.

Figure 4:
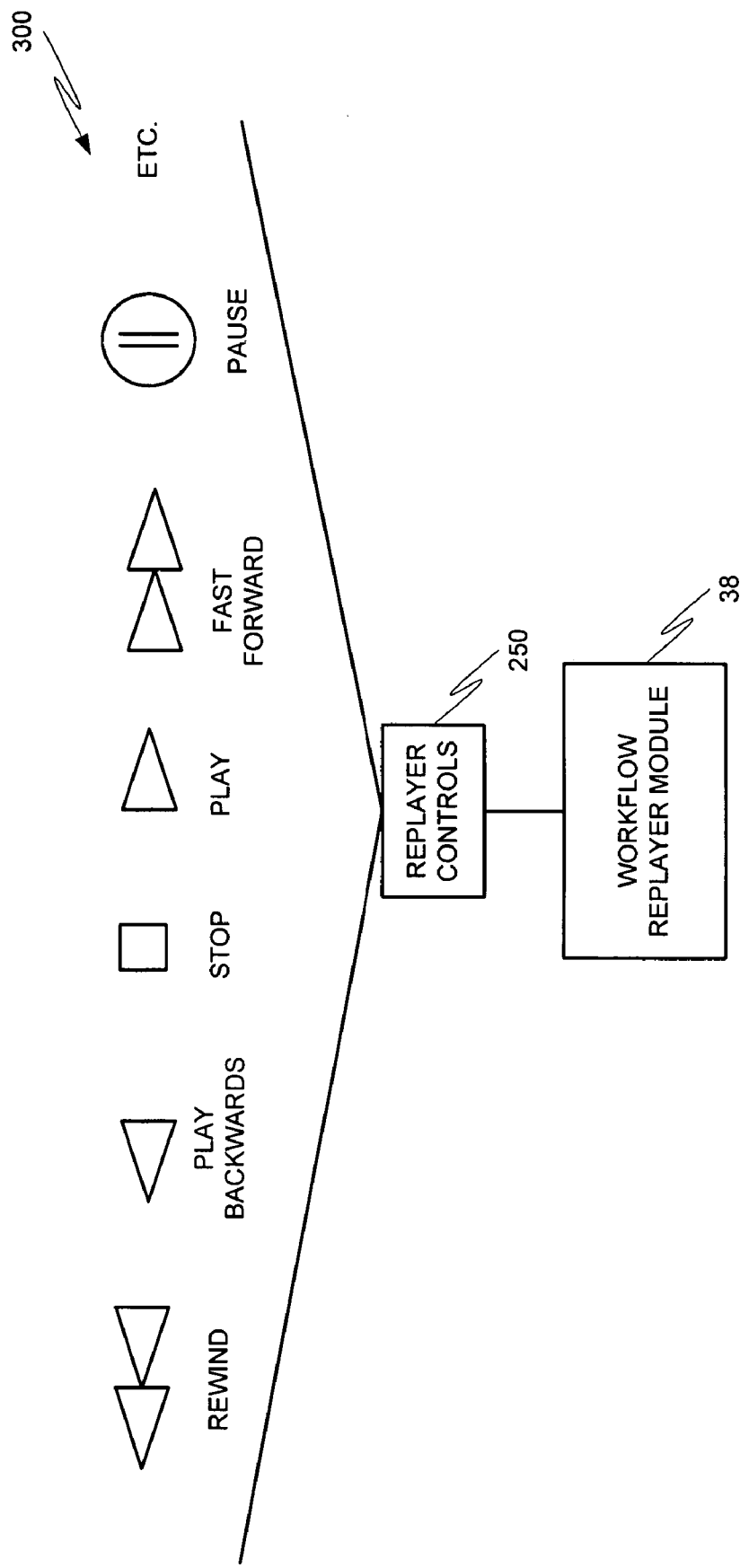
FIG. 4 is a graphical depiction of example replayer controls that can be provided to a user in replaying historical workflow data.

As shown in FIG. 4, replayer controls 250 can resemble controls 300 used in a tape cassette device. A palette containing the replayer controls 250 may be displayed along with the workflow replay data on the user's screen. However, it should be understood that many different ways can be used to provide access to a user to the replayer controls 250, such as providing menu option items to control the workflow replay or assigning keyboard shortcuts.

Figure 5:
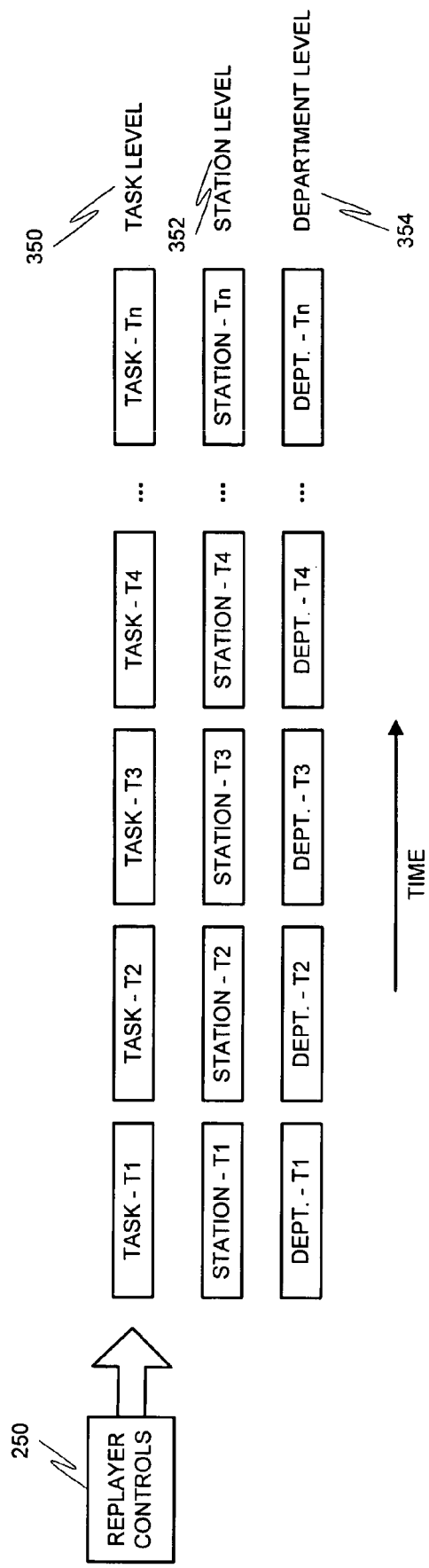
FIG. 5 is a user interface depicting replayer controls being used to select one or more workflow items to display to a user during replaying of historical workflow data.

With reference to FIG. 5, replayer controls 250 can also include operations that allow a user to select at what level the historical workflow data is to be presented to the user. Many different levels exist from which the user can select. A few examples include a task level 350, station level 352, and department level 354. Task level viewing includes focusing on a task or a document as it is processed from station-to-station. Station level viewing includes focusing upon a workstation as it processes a variety of tasks or documents.

Department level viewing includes viewing historical workflow data for groups of workstations. Abstracting to a department level 354 allows a user to see how workflow is being handled within the company at a higher level.

Figure 6:
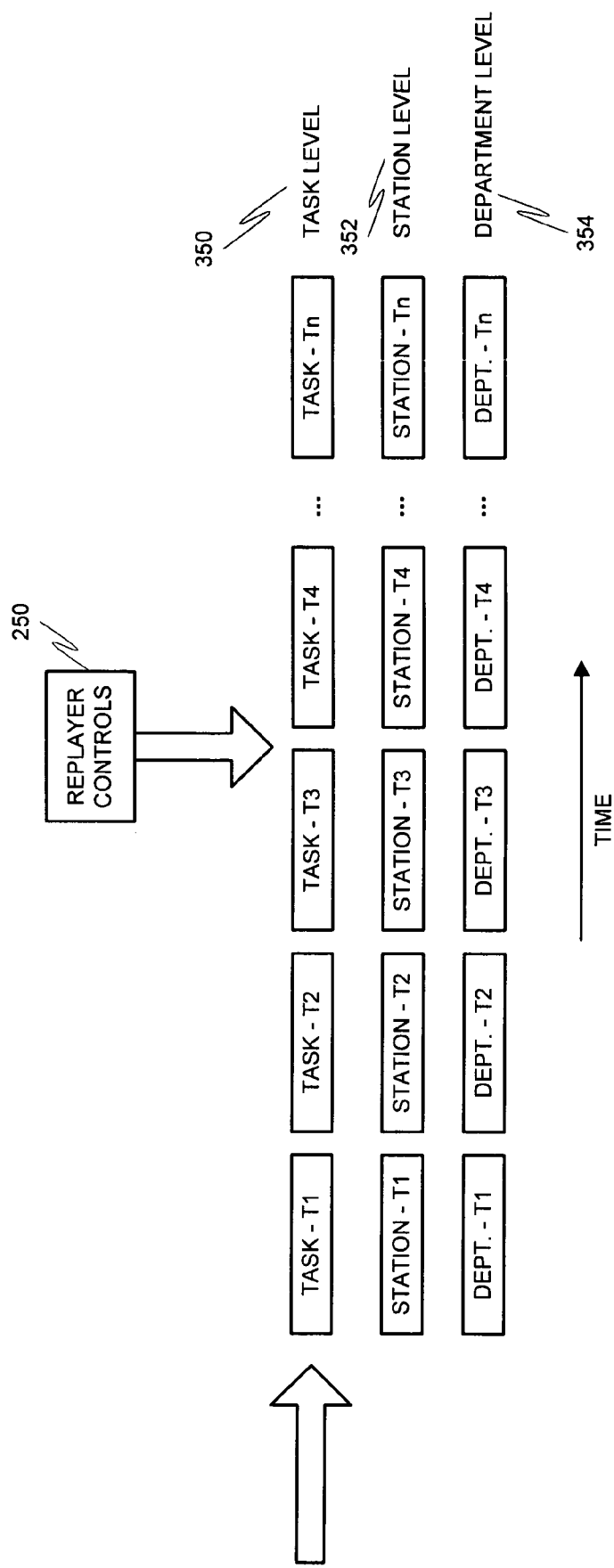
FIG. 6 is a user interface depicting replayer controls selecting a point in time at which replaying of historical workflow data is to initiate.
Figure 7:
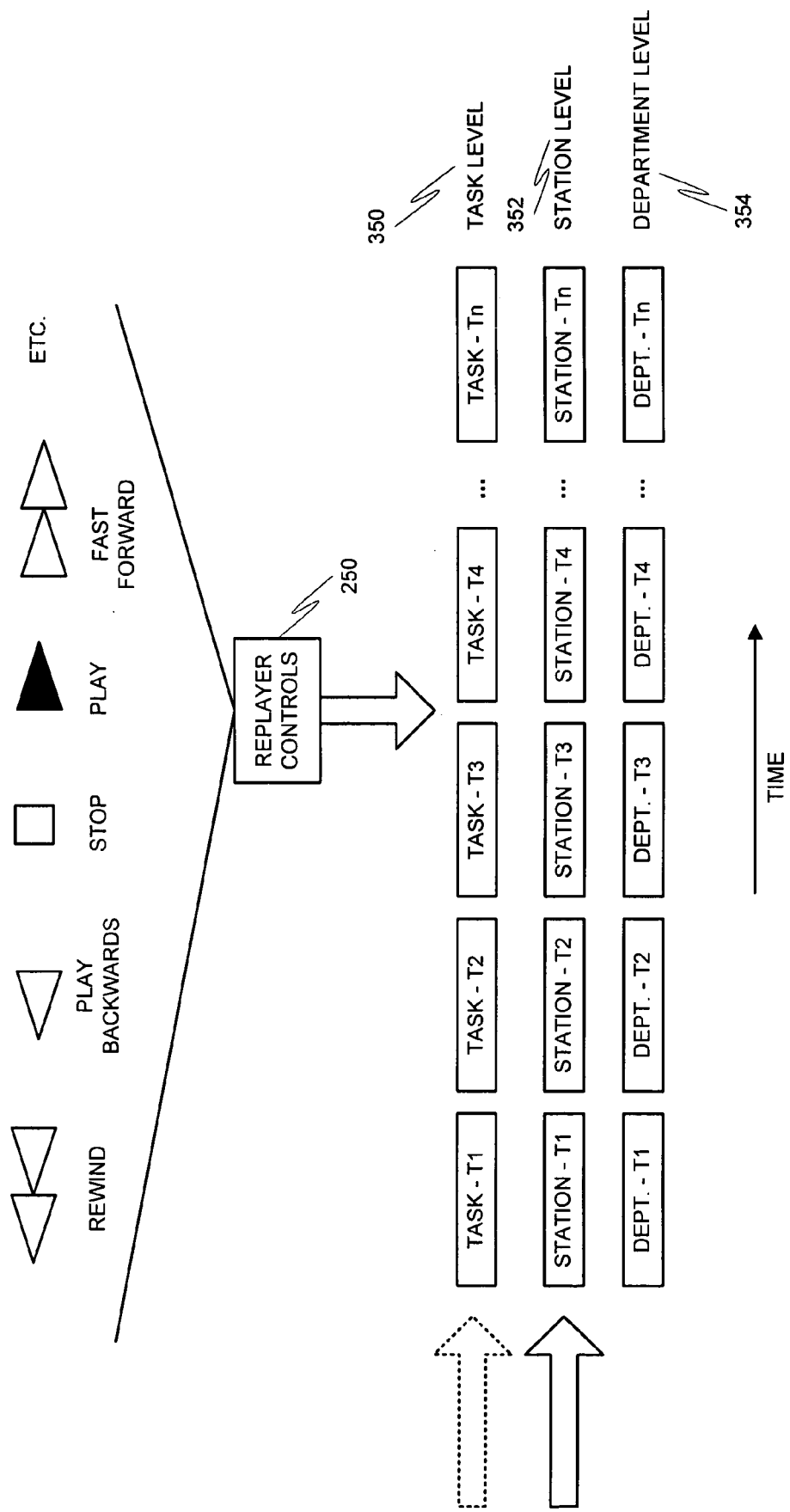
FIG. 7 depicts using replayer controls during the replaying of historical workflow data.

As shown in FIG. 6, replayer controls 250 can be used to select the point in time at which the user would like to begin replaying the workflow data. The user can slide up and down the time line before selecting a point in time from which replaying should begin. FIG. 7 illustrates that during playing of historical workflow data, a user can seamlessly switch views, such as from a task level view to a workstation level view.

Figure 8:
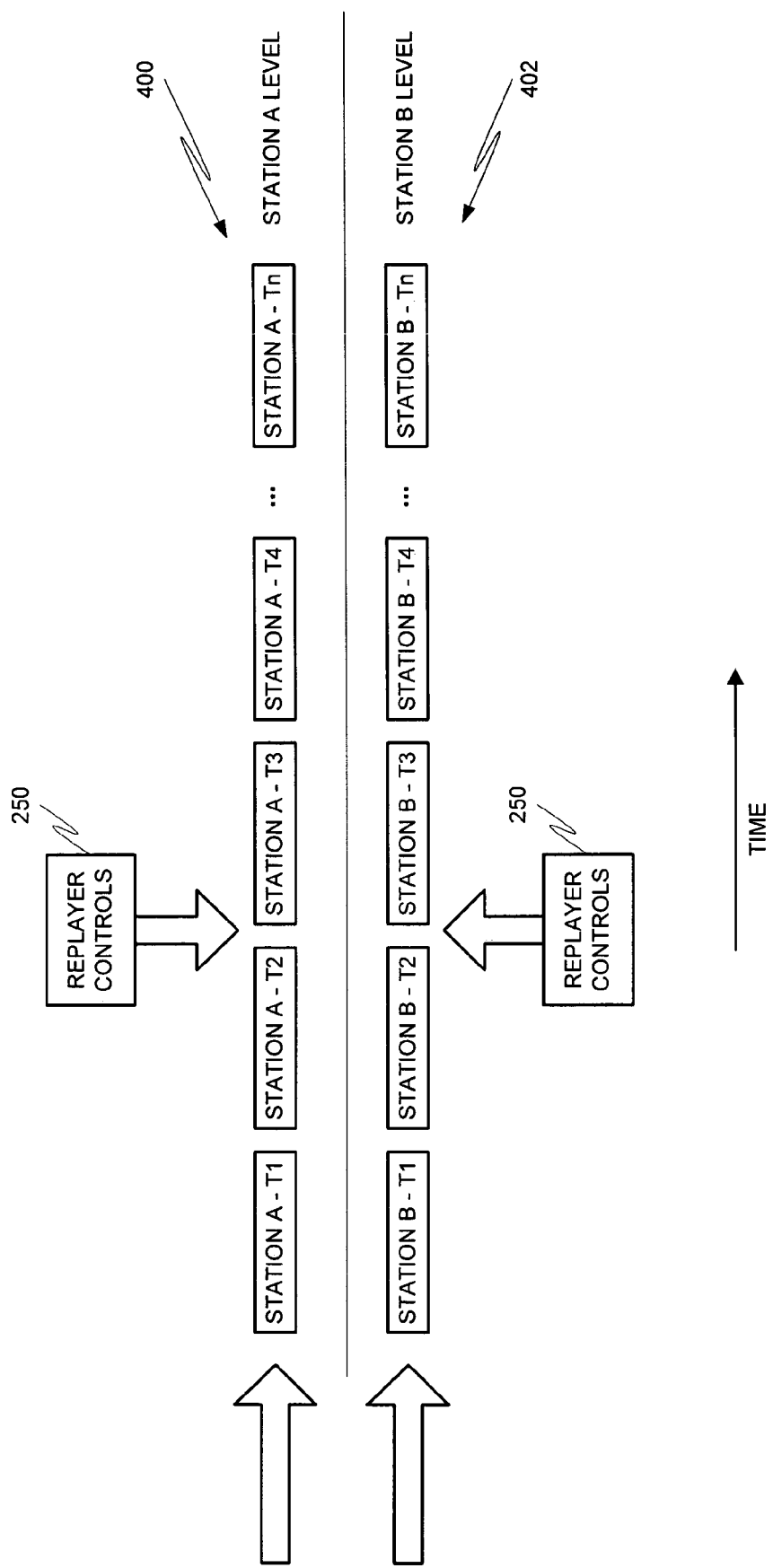
FIG. 8 is a user interface depicting the use of replayer controls during the replaying of two workstations.

FIG. 8 illustrates that a user can elect to see two workflow items (400, 402) side-by-side and to view how they progress over time. As shown in FIG. 8, workstation A and workstation B are presented side-by-side to the user. The historical workflow data is replayed for both workstations and the user can check such aspects as interaction between the two workstations. The user can use replayer controls 250 to stop the replaying of one workstation while the other workstation continues to play. As another example, the user can specify a different point in time at which workstation A is to play from than workstation B (e.g., the historical workflow data for workstation A may be independently replayed on the user interface from the replaying of workstation B).

Figure 9:
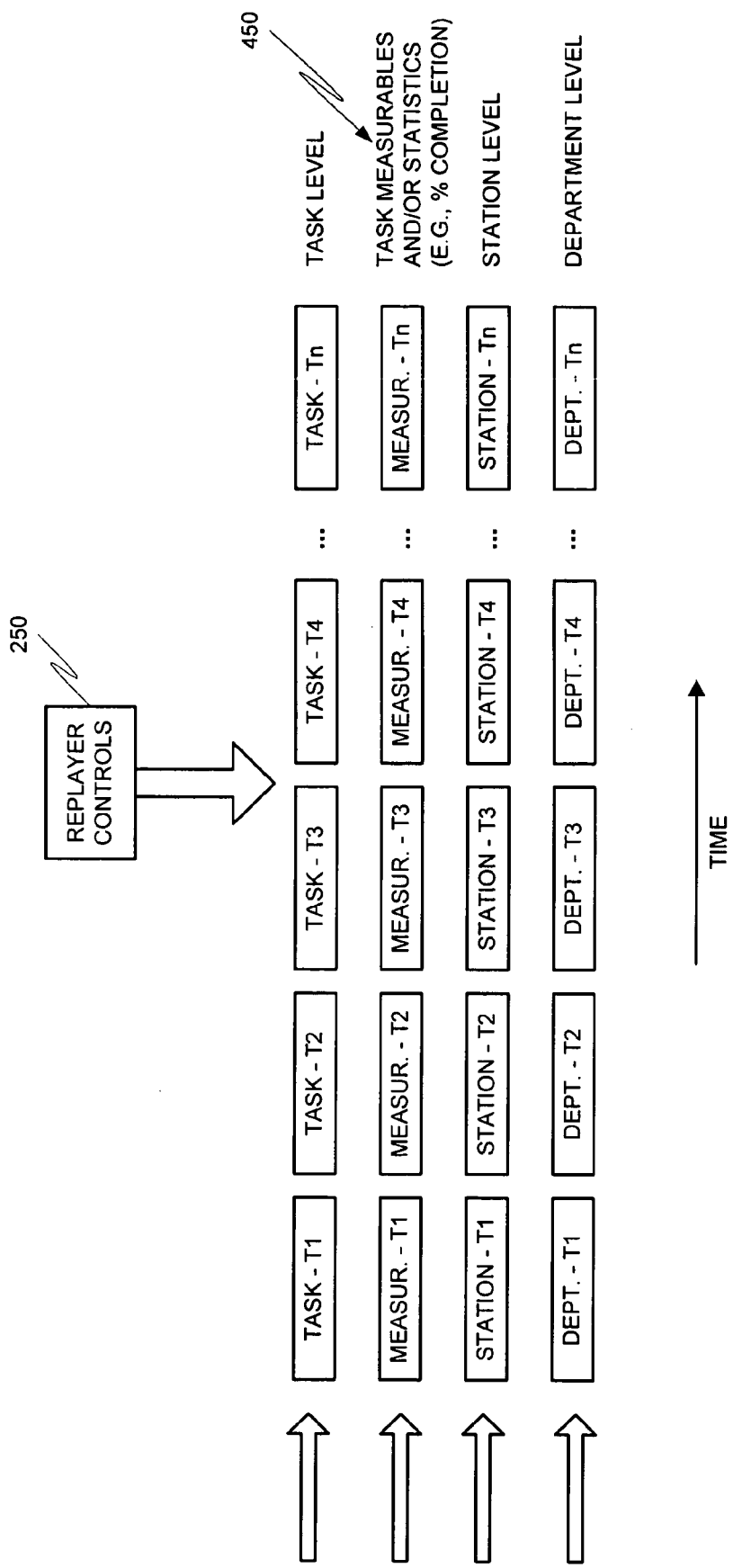
FIG. 9 is a user interface depicting the use of replayer controls during the replaying of multiple workflow items.

FIG. 9 illustrates at 450 that statistical measures can be shown to the user as historical workflow data is replayed. The statistical measures 450 (e.g., task completion percentage) can be updated to match the changing timeframe. It should be understood that other comparative type displays can be used. As an illustration, if the end of a quarter is typically problematic for a company, then past workflows from one or more previous quarters can be replayed side-by-side. In this comparative mode, a user can relive the experience from the past quarters and figure out what went wrong and how to prevent reoccurrence of the problems.

Figure 10:
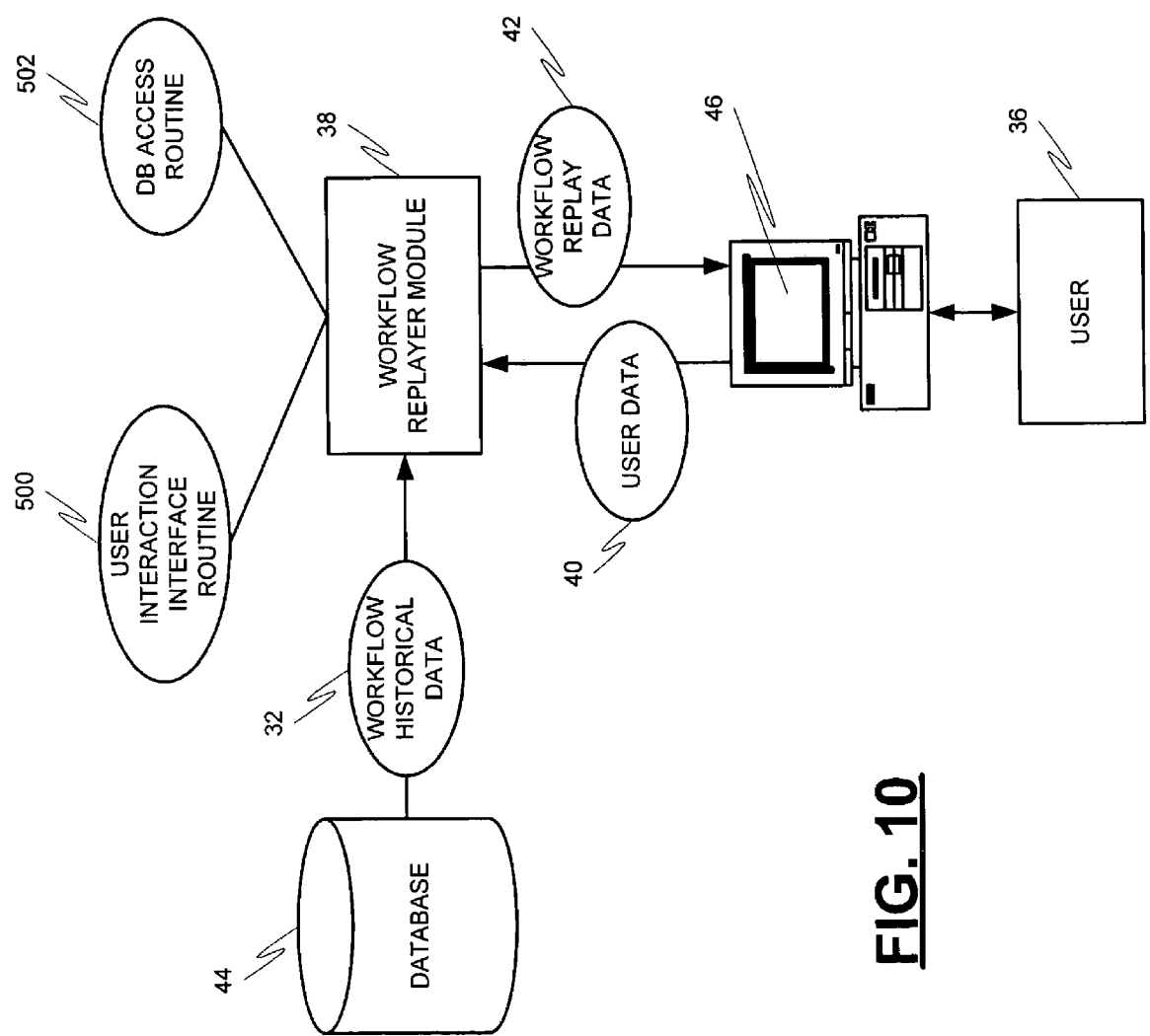
FIG. 10 is a block diagram depicting routines that handle user interaction and database access.

With reference to FIG. 10, a workflow replayer module 38 includes software code portions (e.g., software routines) to handle interaction with the user 36 and accessing of the database 44. The user interaction code 500 allows the user 36 to specify what workflow items the user 36 wishes to replay and/or the timeframe of interest. The database access code 502 retrieves workflow historical data 32 for use in generating displays to the user 36. The user interaction code 500 provides, for display upon the user interface 46, the retrieved workflow historical data 32 that corresponds to the timeframe that the user 36 wishes to replay. The user interaction code 500 may also provide additional data that designates the format (e.g., graphical and/or textual format) by which the historical workflow data 32 is to be displayed on the user interface 46.

Figure 11:
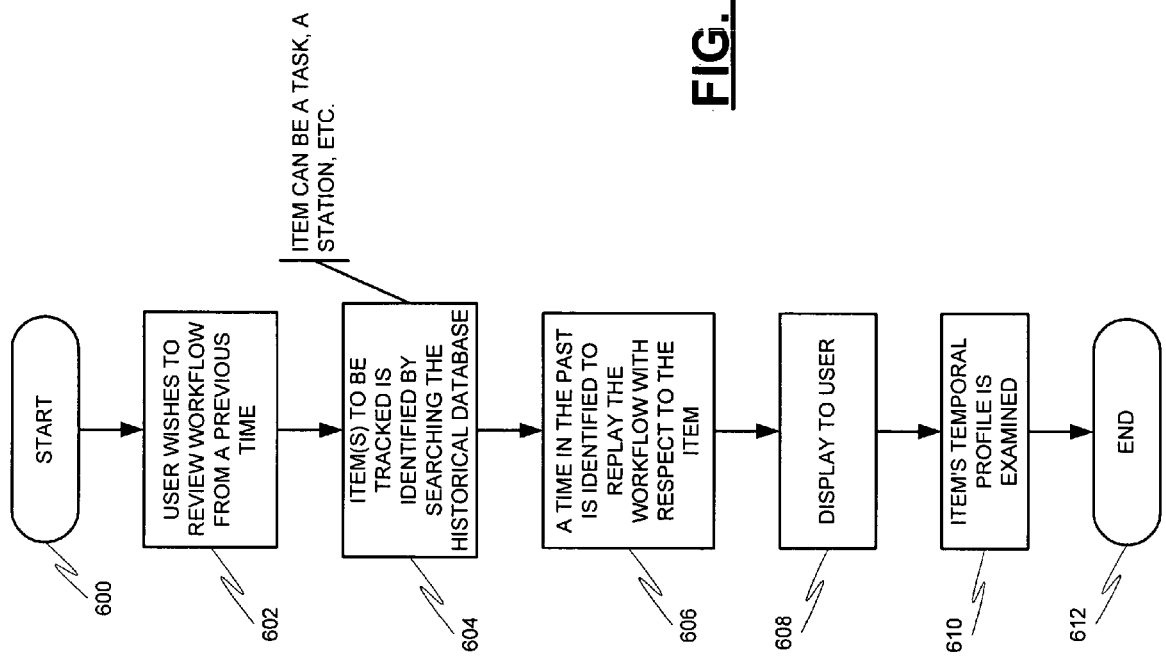
FIG. 11 is a flowchart depicting an example operational scenario involving the replaying of historical workflow data.

FIG. 11 depicts a flowchart illustrating an operational workflow replaying scenario. With reference to FIG. 11, start block 600 indicates that at step 602, a user wishes to review historical workflow data that occurred at a previous time, such as yesterday or last month. At step 604, the workflow database is searched for the desired historical workflow data. The search may retrieve all of the historical workflow data from the database that corresponds to the specified time period and/or workflow items of interest. The search results may be stored locally on the same computer on which the workflow replayer module operates. However, it should be understood that other database access and data storage approaches may be used, such as retrieving historical workflow data from the database as the user goes forwards or backwards through the historical workflow data and storing the retrieved data on the user's local computer.

At step 606, replaying operations may wait until the user specifies the time point at which replaying shall begin, or the historical workflow data may automatically begin playing at the earliest time point provided in the retrieved historical workflow data. One or more of the workflow item's historical information is displayed to the user at step 608.

The user may replay the entire historical workflow data, or may elect to run another historical workflow data search, or may do some other workflow-related analyses as shown at 610. This operational scenario terminates at end block 612. It should be understood that similar to the other processing flows described herein, the steps and the order of the steps in the flowchart may be altered, modified and/or augmented and still achieve the desired outcome.

Figure 12:
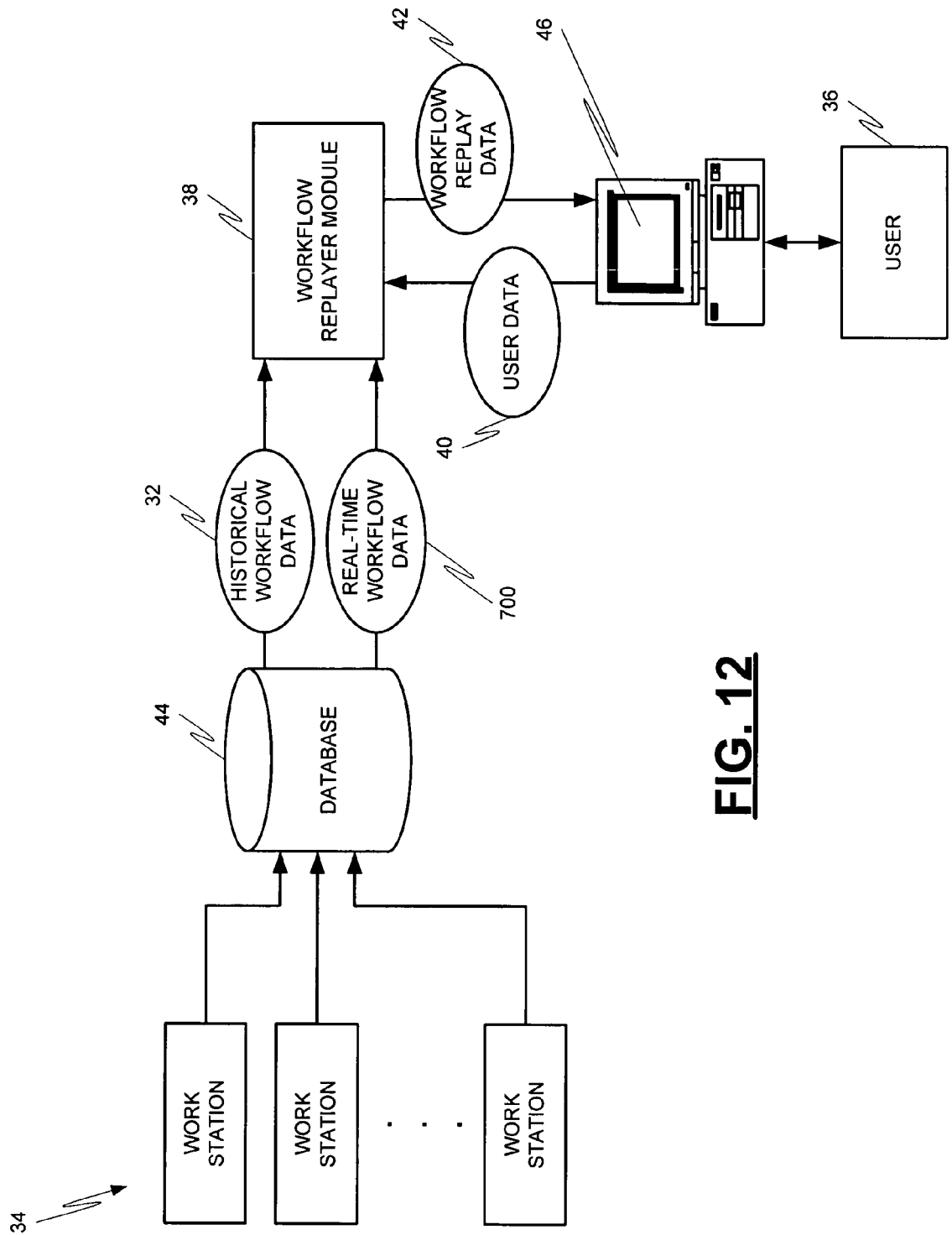
FIG. 12 is a block diagram depicting the replaying of historical workflow data while viewing real-time workflow data.
Figure 13:
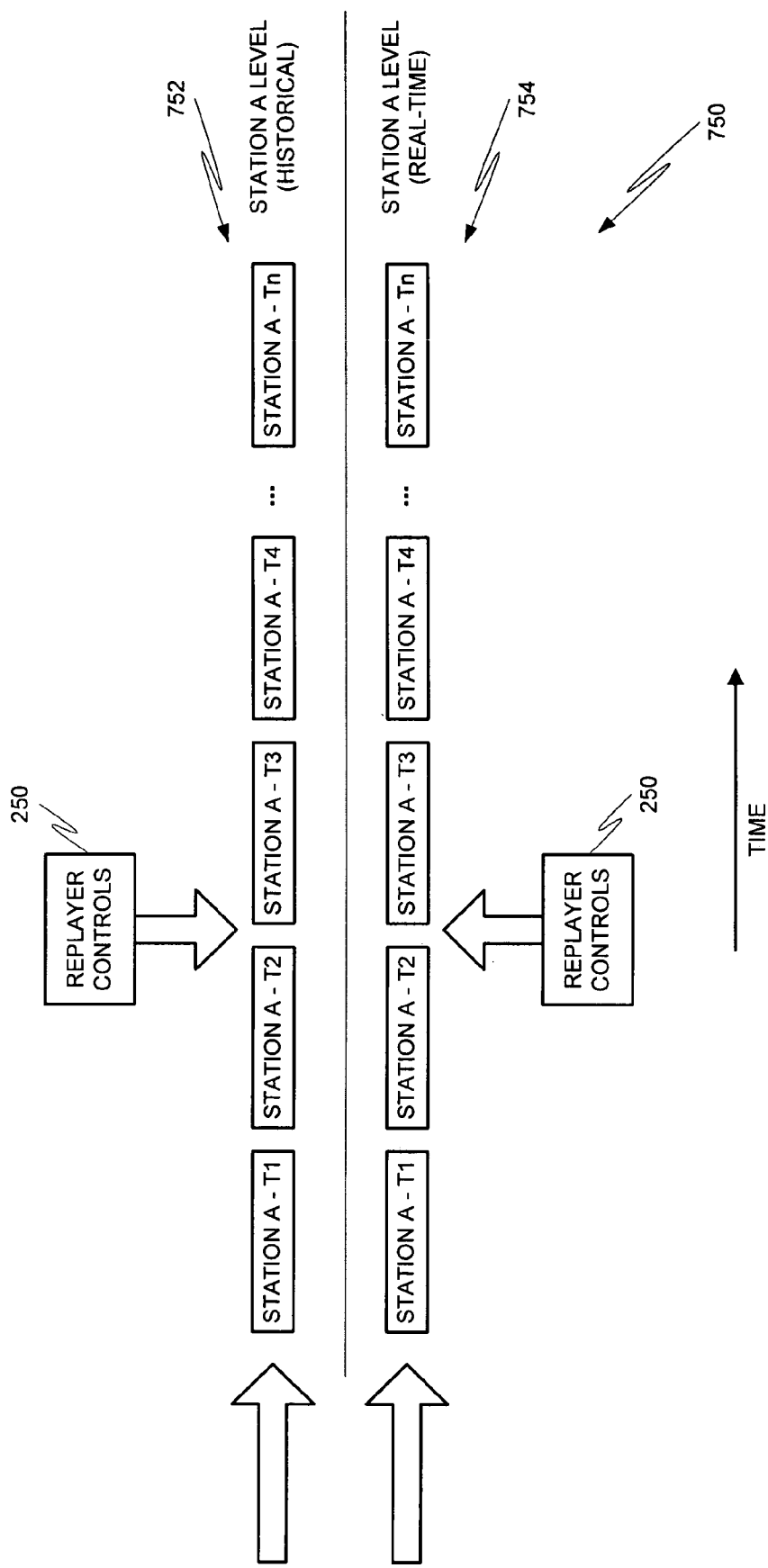
FIG. 13 is a user interface depicting the replaying of historical workflow data while viewing real-time workflow data.

As an example of other workflow-related analyses, the user may choose to compare historical workflow data with actual real-time workflow data. As shown in FIG. 12, a workflow replayer module 38 retrieves both historical workflow data 32 as well as real-time workflow data 700 in order for the comparison to be performed. The database 44 may be a single database or a group of databases, wherein at least one of the databases is an archival database for storing the historical workflow data, and another database stores workflow data being collected in real-time. FIG. 13 illustrates at 750 a user interface that compares a workstation's historical workflow information 752 with the workstation's current real-time workflow information 754.

A manager may at the same time as other managers decide to access a workflow replayer module to review historical workflow data. The managers operating on different computers over a network (such as an intranet or Internet network) can concurrently and independently replay on their computer screens the same or different historical workflow data while allowing others to continue to operate. Such an operational scenario illustrates that business managers can analyze workflow without having to, for example, pour over printouts of static historical workflow data. Among other things, this frees business managers from having to manually interrelate tasks and workstations with time periods to assess how a workflow problem may have arisen.

While examples have been used to disclose the invention, including the best mode, and also to enable a person skilled in the art to make and use the invention, the patentable scope of the invention is defined by claims, and may include other examples that occur to those skilled in the art.

As an example of the wide range and scope of the systems and methods disclosed herein, a workflow replayer module may be implemented in many different configurations. For example, a workflow replayer module may reside on a user's computer, or may reside on a server computer that generates the workflow replaying data for display on the user client computer's interface.

A workflow replayer module can also be used with a wide range of workflow software packages. For example, it may operate with a workflow software package that automates the workflow process by routing images and applications and forms and documents from desk to desk to ensure uniform rules (e.g., governmental regulatory requirements) as well as to improve efficiency of workers by obviating the need for them to have to look for all the documents and information they need to handle their respective portion of the overall task. An example of a commercially available workflow software package that performs routing of tasks and documents among workstations is the Onbase® Workflow software product from Hyland Software, Inc. (with offices in Westlake, Ohio).

As yet another example of the wide ranging uses and scope of the systems and methods disclosed herein, the systems and methods may be used in many different workflow environments, such as an insurance claim processing, medical records processing, loan application processing, accounts payable processing, etc.

Still further, the systems and methods disclosed herein may have their information (e.g., historical workflow data, workflow replay data, etc.) transmitted via data signals embodied on carrier signals (e.g., radio frequency carrier signals) or other communication pathways (e.g., fiber optics, infrared, etc.). The systems and methods may be provided on different types of computer readable media including instructions being executable by a computer to perform the operations described herein.

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

It is claimed as the invention:

1. A computer-implemented method for a user to view historical workflow data, comprising the steps of:
   receiving from a user historical workflow criteria that comprises a start time and end time for a specific time frame of interest for workflow data;
   retrieving historical workflow data collected during processing of a workflow item whose processing was completed in the past from a group of databases based upon the received criteria;
   providing data based upon the retrieved historical workflow data that has a temporal profile that allow a generated user interface to visually replay the historical workflow data as it existed at a plurality of points in time in the past;
      wherein the generated user interface includes simultaneously displaying the visually replayed historical workflow data with multiple different levels of detail;
      wherein the generated user interface includes numerical statistical measures associated with at least one of the multiple different levels of detail;
      wherein the provided data is used to progress in time the replaying of the historical workflow data; and
   providing replayer controls that allow a user to select the point in time at which the user would like to begin replaying the historical workflow data.

2. The method of claim 1, wherein a workflow search interface is provided to the user, wherein the user interacts with the workflow search interface to identify a time period for use in retrieving historical workflow data from the database;
   wherein the multiple levels of detail include a task level, a station level, and a department level;
   wherein the statistical measures include a task completion statistical measure and are updated to match a changing time frame.

3. The method of claim 1, wherein a workflow search interface is provided to the user, wherein the user interacts with the workflow search interface to identify a workflow item for use in retrieving historical workflow data from the database.

4. The method of claim 3, wherein the workflow item is a workflow task.

5. The method of claim 3, wherein the workflow item is a workflow document.

6. The method of claim 3, wherein the workflow item is a workflow workstation.

7. The method of claim 1, wherein the database is configured to store workflow data related to the processing of the workflow item.

8. The method of claim 7, wherein the stored workflow data includes how tasks are structured for processing the workflow item.

9. The method of claim 8, wherein the stored workflow data includes who performs the tasks.

10. The method of claim 9, wherein the stored workflow data includes how the tasks are synchronized.

11. The method of claim 9, wherein the stored workflow data includes how information flows to support the tasks.

12. The method of claim 9, wherein the stored workflow data includes how tasks are being tracked.

13. The method of claim 9, wherein the stored workflow data includes financial information related to the workflow item.

14. The method of claim 1, wherein the processing of a workflow item includes processing of a workflow task.

15. The method of claim 1, wherein the processing of a workflow item includes processing of a workflow document.

16. The method of claim 1, wherein the workflow item is processed by personnel at different workstations.

17. The method of claim 1, wherein the user interface allows the user to visually analyze the workflow data that had been collected over a period of time.

18. The method of claim 1, wherein the provided data includes workflow replay data that indicates how the historical workflow data is to be displayed on the user interface.

19. The method of claim 18, wherein the workflow replay data is generated based upon the retrieved historical workflow data.

20. The method of claim 1, wherein the replayer controls are provided such that the user can proceed forwards and backwards through the retrieved historical workflow data.

21. The method of claim 20, wherein the replayer controls allow the user to manipulate the display on the user interface workflow by being configured to rewind the historical workflow data backwards in time.

22. The method of claim 20, wherein the replayer controls allow the user to manipulate the display on the user interface workflow by being configured to play the historical workflow data backwards in time.

23. The method of claim 20, wherein the replayer controls allow the user to manipulate the display on the user interface workflow by being configured to fast forward through the historical workflow data.

24. The method of claim 20, wherein the replayer controls allow the user to manipulate the display on the user interface workflow by being configured to pause the replaying of the historical workflow data.

25. The method of claim 20, wherein the replayer controls operable by the user resemble controls used on a tape cassette device.

26. The method of claim 20, wherein the replayer controls operable by the user allow the user to select a level of workflow-related detail for viewing the replayed historical workstation data.

27. The method of claim 1, wherein the provided data allows a user to view the retrieved historical workflow data against a live database, without disturbing actual location of those documents involved in the historical workflow data replaying.

28. The method of claim 1, wherein the provided data allows a user to compare different workflow items contained in the retrieved historical workflow data.

29. The method of claim 28, wherein the workflow item comparison displayed on the user interface shows interrelationships among the different workflow items.

30. The method of claim 29, wherein the workflow item comparison displayed on the user interface shows temporal interrelationships among the different workflow items.

31. The method of claim 1, wherein real-time workflow data is retrieved from the database so that the retrieved workflow data can be compared on the user interface with the displayed historical workflow data.

32. The method of claim 1, wherein the provided data allows a user to view the retrieved historical workflow data against a live database, without disturbing current real-time processing of workflow items by workstations.

33. The method of claim 1, wherein the replaying of the historical workflow data is displayed on the user interface in a textual format.

34. The method of claim 33, wherein the replaying of the historical workflow data is displayed on the user interface in a graphical format.

35. The method of claim 34, wherein the graphical format includes presenting a graphical layout of workstations which is updated while the historical workflow data is replayed to show which workstations are working on a task at different points in time.

36. The method of claim 1, wherein the time increment at which the workflow historical data is replayed is changed by the user.

37. The method of claim 36, wherein the time increment is changed so as to allow greater detail of the historical workflow data that is displayed to the user.

38. The method of claim 36, wherein the time increment is changed so as to allow less detail of the historical workflow data that is displayed to the user.

39. The method of claim 1, wherein multiple users are provided with historical workflow data for replay upon their respective user interfaces.

40. The method of claim 1, wherein a network is used to provide multiple users with historical workflow data for replay upon their respective user interfaces.

41. The method of claim 40, wherein a server has a connection to the network, wherein the server includes computer instructions for retrieving historical workflow data from the database.

42. The method of claim 1, wherein at least one of the databases is an archival database for storing the historical workflow data.

43. The method of claim 42, wherein at least one of the databases stores workflow data being collected in real-time.

44. A computer-implemented apparatus for a user to view historical workflow data, comprising:
  means for receiving from a user historical workflow criteria that comprises a start time and end time for a specific time frame of interest for workflow data;
  means for retrieving historical workflow data collected during processing of a workflow item whose processing was completed in the past from a group of databases based upon the received criteria;
  means for providing data based upon the retrieved historical workflow data that has a temporal profile that allow a generated user interface to visually replay the historical workflow data as it existed at a plurality of points in time in the past;
    wherein the generated user interface includes simultaneously displaying the visually replayed historical workflow data with multiple different levels of detail;
    wherein the generated user interface includes numerical statistical measures associated with at least one of the multiple different levels of detail;
    wherein the provided data allows the user interface to advance in time the replaying of the historical workflow data; and
  means for providing replayer controls that allow a user to select the point in time at which the user would like to begin replaying the historical workflow data.

* * * * *